E. Shopbell,
Boot Pattern,

No. 2,922, Reissued Apr. 28, 1868.

Witnesses
J. H. Bunnigy
J. Holmes

Inventor
E. Shopbell

N. PETERS, PHOTO-LITHOGRAPHER, WASHINGTON, D. C.

United States Patent Office.

ELIAS SHOPBELL, OF ASHLAND, OHIO.

*Letters Patent No.* 37,526, *dated January* 27, 1863; *reissue No.* 2,922, *dated April* 28, 1868.

IMPROVED PATTERN FOR CUTTING BOOTS.

The Schedule referred to in these Letters Patent and making part of the same.

TO ALL WHOM IT MAY CONCERN:

Specification for a reissue of Patterns for Cutting Boots, invented by ELIAS SHOPBELL, of Ashland, in the county of Ashland, and State of Ohio.

Like letters of reference refer to like parts in the several views.

The nature of my invention relates to the combination of several plates, of such form and in such a manner, that, when thus combined, form boot-patterns that can be adjusted at one operation to any required size by means of the simultaneous and proportional extension of the several movable parts, which are all secured to a centre-plate by slots, headed pins, and thumb-screw, the width of the pattern varying in different parts as the extension takes place; in other words, varying unequally, for reasons hereinafter stated.

Figure 1:
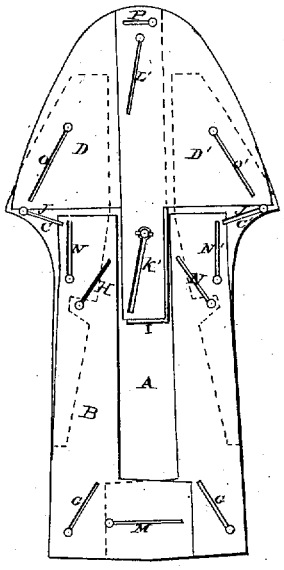
Figure 1 is a top view of a pattern for the upper part of the boot, shown contracted to its smallest size.
Figure 2:
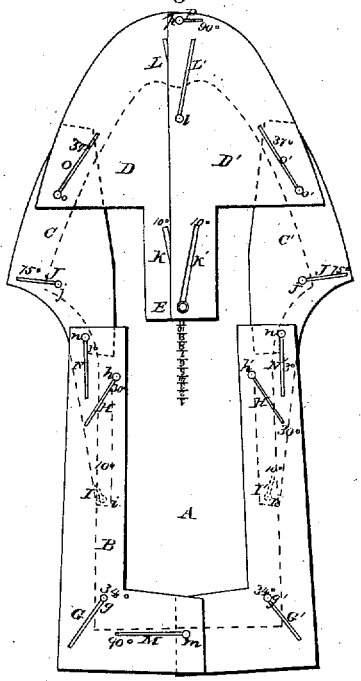
Figure 2 is a top view of the same, extended to its largest size.
Figure 3:
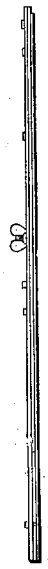
Figure 3 is an edge view.

In fig. 1, the pattern for the upper part of the boot is composed of seven plates, one of which is stationary, and is marked A, the other six being in pairs, as seen at B B′, C C′, and D D′, and are in all respects duplicates of each other, with the single exception of their several positions.

The stationary plate A is seventeen inches long, eight and one-half inches wide at the instep, five and one-half inches wide at the ankle, and six inches wide at the top. But the size may be varied so long as the same proportions are preserved. Its general outline is shown in fig. 1.

The adjustable plates B B′, C C′, and D D′, when contracted to their smallest limits, have their outer margins coincide with the plate A. These movable plates are all provided with slots running at various angles in relation to the base-line *x x*. Headed pins pass through these slots, with one exception, (the thumb-screw,) and secure the moving plates to the stationary plates and to each other. The various angles of the slots govern the proportional extension of the movable plates, and they are so secured to each other as to move only in concert. The whole are secured in any desired position by a thumb-screw, E.

A scale, F, varying from 1 to 11, marks the size of the pattern.

I will now proceed to describe the position and angle of the slots that work upon the pins attached to the stationary plate A. The slots G G′ are situated near the upper and outer corners of the plates B B′, and have respectively an angle upward and outward of thirty-four degrees, and slide upon the stationary pins *g g′*. The slots H H′ are situated at the opposite end of the plates B B′, and have an angle upward and outward of thirty degrees, and slide upon the pins *h h′*.

The plates C C′ have slots I I′ at their upper ends, having their angles downward and outward ten degrees, and move upon the pins *i i′*. The slots J J′ are situated at the widest part of the pattern, and have their inclination outward and downward at an angle of seventy-five degrees. The plates D D′ have slots K K′ at their upper ends, having their angles downward and outward ten degrees. They slide upon the thumb-screw E. The slots L L′ are situated at the lower end or toe of the patterns, and have an angle downward and outward of eight degrees, and move upon the pin *l*.

In addition to the slots that work upon the stationary pins, as above described, the movable plates have other slots, which work upon pins in the corresponding fellow-plates, as follows:

At the top of the plate B is a slot, M, situated at right angles to the line *x x*, and works upon the pin *m* in the plate B′. At the lower end of the plates B B′ are slots N N′, inclining upward and outward at an angle of three degrees, and slide upon the pins *n n′* in the plates C C′. The plates D D′ have slots O O′, situated at the outer angle, and inclining inward towards the toe at an angle of thirty-seven degrees, and slide upon pins *o o′* in the plates C C′. At the toe of the plate D′ is a slot, *f*, situated at right angles to the base-line *x x*, and slides upon the pin *p* in the plate D.

In extending this pattern from the smallest to the largest size, as marked upon the scale F, the expansion in different parts is unequal; that is, while the instep expands two inches in width, the lower part of the leg or ankle expands but one and a half inch, and the top of the leg one and three-quarters inch, and in the whole length of the pattern the extension is three and a half inches. It will thus be observed that this disproportional scale of extension is due to the peculiar angles of the several slots, and it follows therefrom, that a small boot is cut proportionally larger in the leg than the larger sizes, and this difference is upon a regular scale. In other words, the plates will move proportionally, so as to give depth to the instep, making the front wider across the instep from corner to corner, and leaving the leg smaller in proportion as the boot is cut larger, and, in contracting the pattern to boys' size, the leg is cut proportionally larger than men's sizes, which is a necessary condition in order to fit both the juvenile and mature leg. In whatever position these plates are put, or to whatever scale they are set, the margins always show a smooth outline.

It is proper here to remark, that the angles here given are measured upon the extended pattern. All of them will vary more or less with the expansion or contraction of the pattern. The location of the several slots, and their respective angles, has been the result of much study and experiment, and I believe the results are the production of the most perfect pattern that has ever been constructed.

Figure 4:
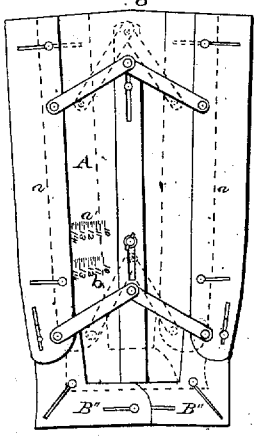
Figure 4 is a view of a pattern for the hind quarter of the boot, shown expanded.

It will be observed that the pattern above described is for the upper or fore quarter of the boot, whereas fig. 4 is for the hind quarter, and, as it will be seen, embraces the same principle of construction, the central plate, A′, corresponding to plate A, the side plates, *a*, to the plates B B′, and the corner plates, B″, corresponding in their operation to the plates C C′, the general construction being alike, or analogous in both patterns, though applied to different parts of the same boot, the simultaneous extension and contraction of the several plates being governed by the angle of the slots, and secured in place by the headed pins, substantially as described in the above pattern. On this pattern is also a scale of sizes, *a′ b*, so that the work may be cut to correspond to the upper, and thereby obtain a proportional matching of the respective parts. The scales are also used for cutting coarse and fine boots, so as to make the proper allowance in the different sizes, or for men and boys' boots, the latter being proportionally larger in the leg than men's, the difference in the two scales being one-half inch, *a′* measuring one-half inch larger for coarse boot or for boys' wear, in proportion to the size.

The relative proportion of the two is as follows: For ten-inch heel, they will cut one-half inch larger than the measure for coarse boots or boys'; for eleven-inch heel, one-quarter inch larger; and at twelve inches, they will cut up to the measure; and for thirteen and fourteen-inch heel, they will cut proportionally under, which is a very essential point, and in which all other patterns are different. This, making all the allowance for coarse and fine boots, and of different sizes, makes the pattern convenient and labor-saving. The corner plates B″, being attached to the side plates, will, as the side ones move outward, also move outward at the same time, and, in consequence of the peculiar angle or direction of the slots, will move downward. The extensive and contractive movement of the several plates, though simultaneous, the lateral movement is not equal, owing to the peculiar angle given to the slots. The pattern, when fully extended, will be one-half inch wider across the top than at the bottom, or, in other words, the top will gain one-half inch, and will leave the bottom proportionally smaller than when contraced to a small-sized boot. This is necessary in order to prevent the side seam from running too far into the shank.

Figure 5:
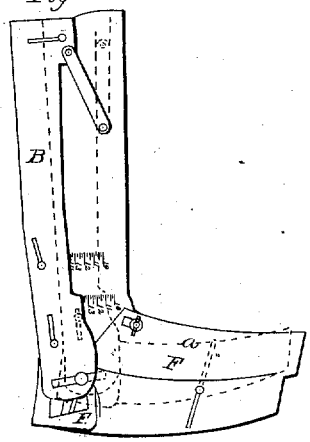
Figure 5 is a view of a pattern for the uppers, with adjustable instep-plate.

Fig. 5 is a pattern which may also be used for the front parts of the boot, which, like the above, consists of a plate, A, to which are attached adjustable plates by slots and pins, as are the above, and which are so arranged as to adapt it to cut larger-sized boots, or vary the height of the instep.

The peculiar angle given to the slots is such that, as the plate B′ is moved back, it will at the same time slightly descend, and thereby preserve the proper relation of the swell of the calf to the rest of the leg of the pattern.

In connection with the plate above described, is a heddle-plate, F, which, in like manner, is attached to the plates B′ and A by slots and pins. This plate is for the purpose of describing the heel, and which is moved in accordance with the extension and contraction of the pattern. Thus, while it is moved in and out horizontally with the plate B′, it can be moved upward or downward to regulate the length of the heel as the height of the instep may require, thereby leaving an unbroken edge around the heel.

It will also be seen that the foot of the pattern is pivoted to the leg at the heel. By this means the toe of the foot can be thrown upward, as indicated by the dotted lines *a*, thereby changing the depth of the instep as the shape of the foot may require. A scale of size is also inscribed on this pattern, similar to that above described, and for an analogous purpose.

I am aware that extension-patterns have been before devised and constructed, but none that I have ever seen produce the gradual and proportional changes that are produced in my pattern. These variations from other patterns, though small they may be, are nevertheless important. Therefore,

What I claim as my improvement, and desire to secure by Letters Patent, is—

1. The plate A, in combination with the pairs of plates B B′, C C′, and D D′, or their equivalents, with their respective slots and angles, producing the simultaneous movement of the several pairs of plates, and the consequent unequal enlargement and contraction of the pattern for boot-fronts, substantially as herein set forth.

2. Stationary and adjustable plates, so constructed and arranged in relation to each other and the slots as to produce a simultaneous contraction and expansion of said plates according to any required size of boot-fronts and backs, substantially as set forth.

ELIAS SHOPBELL.

Witnesses:
A. L. Curtis,
Robt. McMurray.